(12) United States Patent
Reed et al.

(10) Patent No.: US 9,829,995 B1
(45) Date of Patent: Nov. 28, 2017

(54) EYE TRACKING TO MOVE THE CURSOR WITHIN VIEW OF A PILOT

(71) Applicant: Rockwell Collins, Inc., Cedar Rapids, IA (US)

(72) Inventors: Colin D. Reed, Cedar Rapids, IA (US); Bryan C. Schultz, Marion, IA (US); Timothy J. Wittkop, Marion, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/262,993

(22) Filed: Apr. 28, 2014

(51) Int. Cl.
*G06F 3/033* (2013.01)
*G06F 3/0354* (2013.01)

(52) U.S. Cl.
CPC ............ *G06F 3/033* (2013.01); *G06F 3/0354* (2013.01)

(58) Field of Classification Search
CPC ......... G06F 3/013; G06F 3/033; G06F 3/0354
See application file for complete search history.

(56) References Cited

U.S. PATENT DOCUMENTS

| 9,132,913 | B1* | 9/2015 | Shapiro | B64C 19/00 |
|---|---|---|---|---|
| 2009/0196460 | A1* | 8/2009 | Jakobs et al. | 382/103 |
| 2010/0220291 | A1* | 9/2010 | Horning et al. | 351/210 |
| 2012/0105490 | A1* | 5/2012 | Pasquero et al. | 345/690 |
| 2013/0005443 | A1* | 1/2013 | Kosta | G07F 17/3206 463/25 |
| 2013/0280678 | A1* | 10/2013 | Towers | G09B 9/10 434/38 |
| 2014/0039730 | A1* | 2/2014 | Loubiere | B60R 99/00 701/3 |

OTHER PUBLICATIONS

Wikipedia, Flight management system, https://en.wikipedia.org/w/index.php?title=Flight_management_system&oldid=598036701, Mar. 4, 2014, 6 pages.

* cited by examiner

*Primary Examiner* — Mark Regn
(74) *Attorney, Agent, or Firm* — Angel N. Gerdzhikov; Donna P. Suchy; Daniel M. Barbieri (57) ABSTRACT

The present disclosure is directed to a method for managing a location of a cursor on a display. The method may include the step of receiving an input from a user. The method may also include the step of detecting a gaze of the user within the display. The method may also include the step of displaying the cursor on the display within the gaze of the user.

20 Claims, 13 Drawing Sheets

EYE TRACKING TO MOVE THE CURSOR WITHIN VIEW OF A PILOT

CROSS REFERENCE TO RELATED APPLICATIONS

The present application is related to co-pending U.S. patent application Ser. No. 14/013,883 filed on Aug. 29, 2013 and entitled "EYE TRACKING AS A METHOD TO IMPROVE THE USER INTERFACE", which is incorporated herein by reference.

TECHNICAL FIELD

The present disclosure generally relates to the field of flight display applications and more particularly to systems and methods that apply eye tracking technology to flight displays and management systems.

BACKGROUND

Existing systems in a flight deck of an aircraft may use several types of user interface control devices. These control devices may require several steps in order to complete a task, which may require significant time and effort for a user. When multiple users are providing inputs to the interface control devices, problems may arise in differentiating one user from another.

Therefore, there exists a need for improved systems and methods for receiving and providing information via an interface on a flight deck.

SUMMARY

The present disclosure is directed to a method for managing a location of a cursor on a display. The method may include the step of receiving an input from a user. The method may also include the step of detecting a gaze of the user within the display. The method may also include the step of displaying the cursor on the display within the gaze of the user.

The present disclosure is also directed to a user interface system. The user interface system may include an eye tracking sensor configured to detect a gaze of a user. The user interface system may also include a processor in communication with the eye tracking sensor. The processor may be configured to receive the gaze of the user and to display a cursor on a display within the gaze of the user. The processor is further configured to respond to inputs received from the user and move the cursor in coordination with the user input. The user interface system may also include an input device in communication with the processor. The input device is configured to receive the input from the user.

The present disclosure is also directed to a method for identifying a user of an interface configured to receive inputs from two or more users. The method may include the step of receiving an input from at least one of a first user or a second user via an input device. The method may further include the step of detecting at least one of: a gaze, a hand position, a finger position, a thumb position, or a voice command of the at least one of the first user or the second user on the input device. An additional step of the method includes determining an identity of the user upon detection.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Cursors are sometimes difficult to locate on a complex display. In some cases, once the cursor is found it is not in the place it is needed and must be moved to in order to take the desired action. In addition, when two or more users are working with the same system and sharing one or more screens, the system may need to be able to identify which user is providing input to the system. For example, in a three display system in an aircraft, the center display may be a shared display between the pilot and the copilot. In order for the input device or user interface to work properly, the center display needs to know whether the left seat or right seat pilot is interacting with it. In particular, when more than one user is interacting with a touchscreen, this can pose a problem because the touchscreen is unable to differentiate between pilots without additional information.

One method of differentiation between pilots may include the system displaying a dialog box and prompting a pilot to identify his seating position. Some systems may also operate under the assumption that the last pilot who touched the shared display will continue to use the shared display until his individual display is used. In some cases, this method may lead to confusion when one pilot touches the display immediately after the other pilot. Additionally, it may lead to less efficient operation because an additional input is needed to interact with the system. In addition, it may be difficult to visually locate the cursor on the display screen, particularly in complex systems including more than one screen and more than one user. The cursor may not be in the desired location or may not correlate to where the pilot is looking.

Figure 1A:
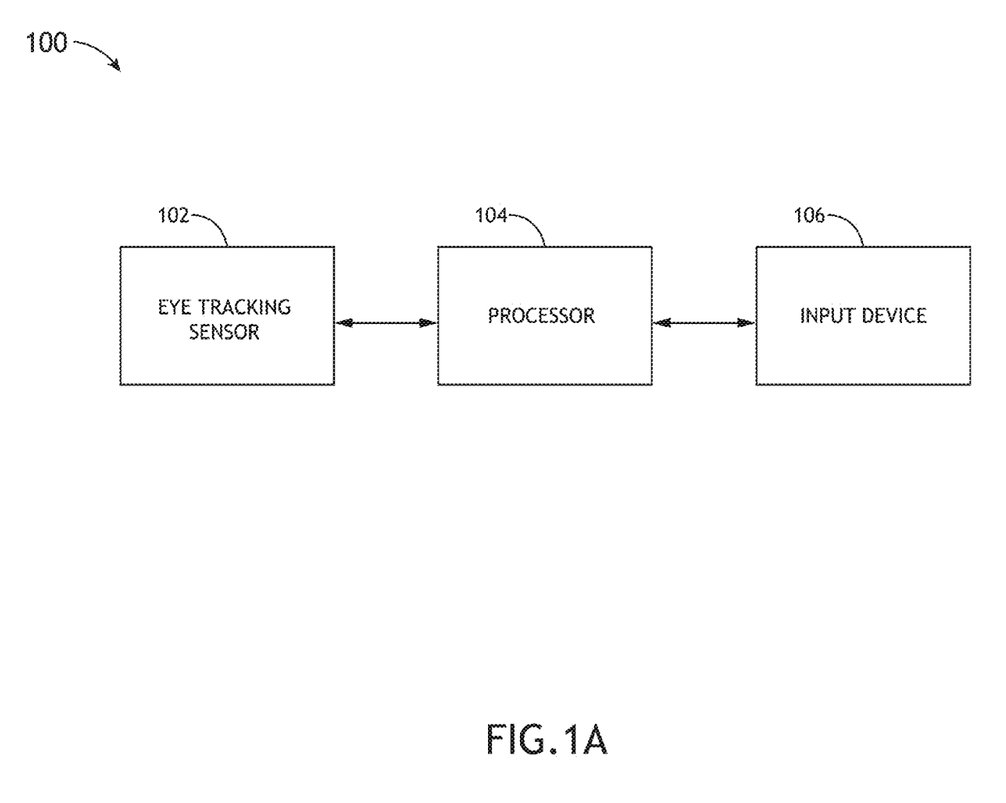
FIG. 1A is a diagram of a user interface system.
Figure 1B:
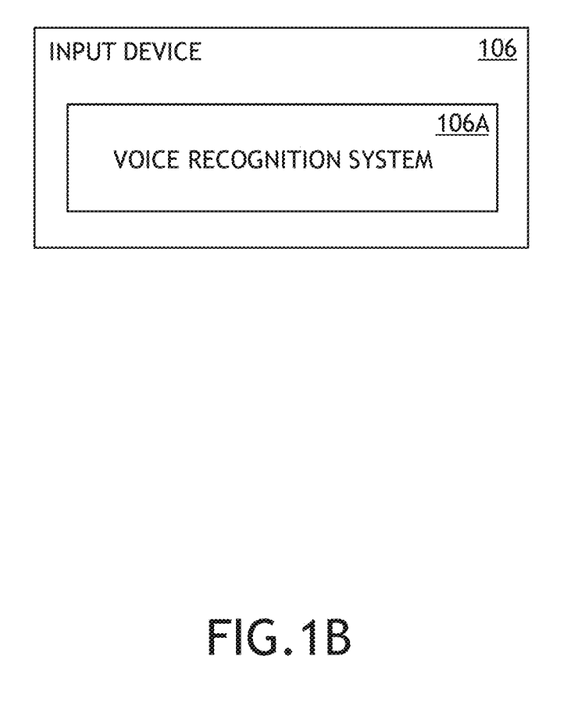
FIG. 1B is a diagram of an input device.
Figure 1C:
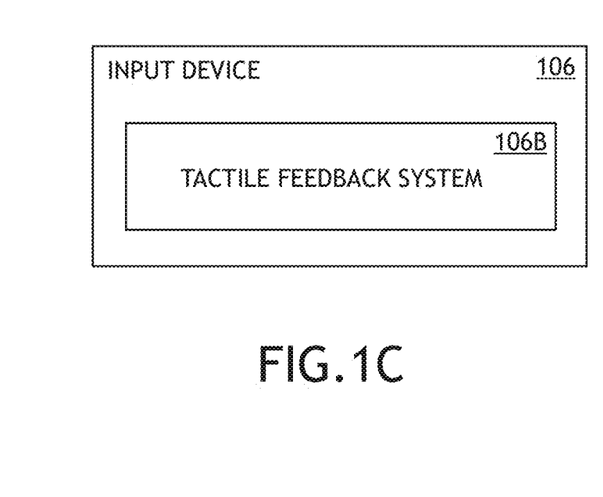
FIG. 1C is a diagram of an input device.
Figure 1D:
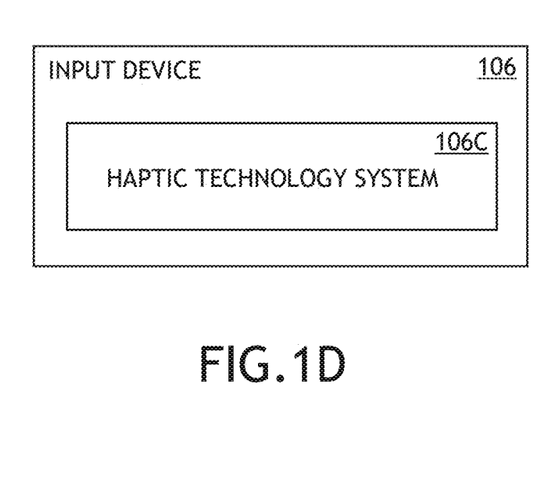
FIG. 1D is a diagram of an input device.
Figure 1E:
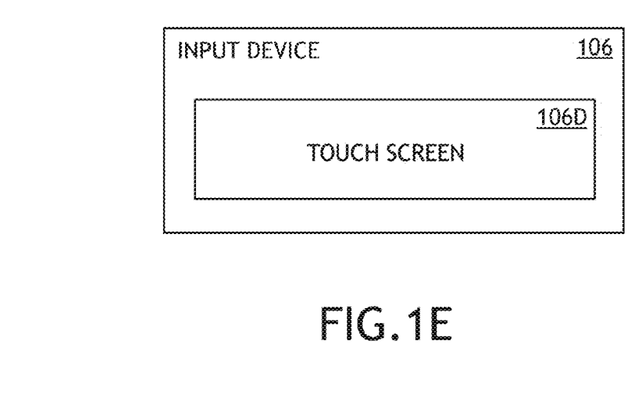
FIG. 1E is a diagram of an input device.
Figure 1F:
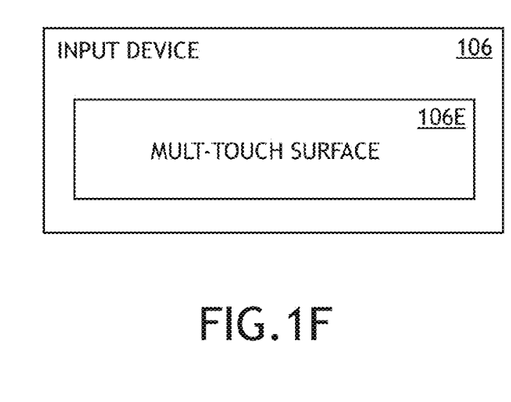
FIG. 1F is a diagram of an input device.
Figure 1G:
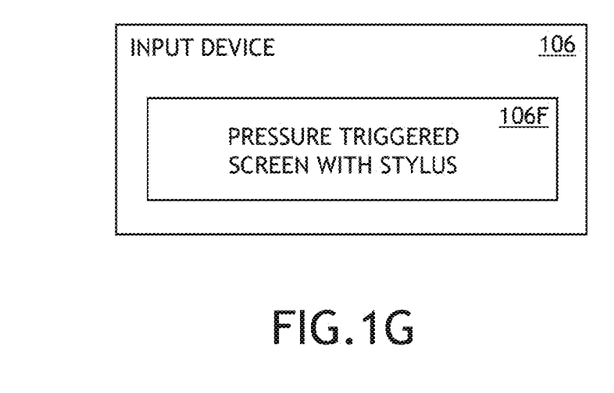
FIG. 1G is a diagram of an input device.
Figure 1H:
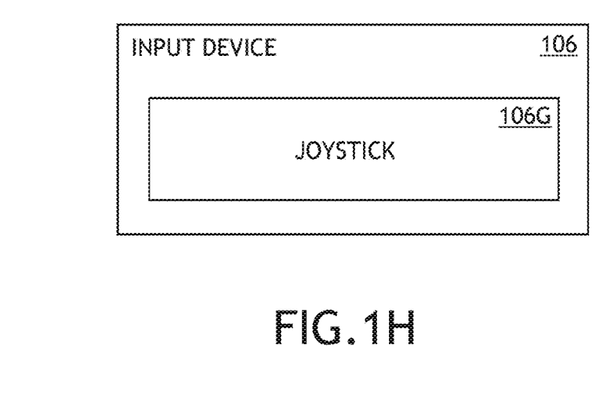
FIG. 1H is a diagram of an input device.
Figure 1I:
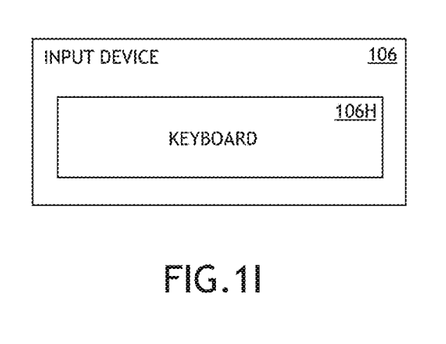
FIG. 1I is a diagram of an input device.
Figure 1J:
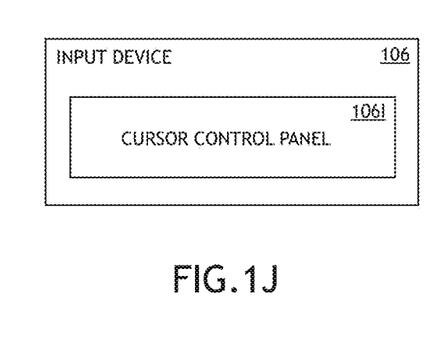
FIG. 1J is a diagram of an input device.
Figure 1K:
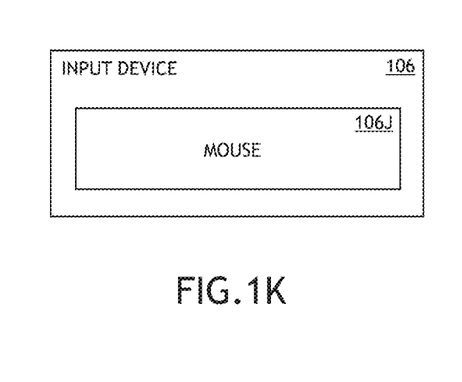
FIG. 1K is a diagram of an input device.

Embodiments of the present disclosure relate to systems and methods for using eye tracking in the user interface on a flight deck. Referring generally to FIGS. 1A-3D, a user interface system 100 is provided. Referring specifically to FIG. 1A, the user interface system 100 includes an eye tracking sensor 102 configured to detect a current gaze of a user viewing a display. The eye tracking sensor 102 is in communication with a processor 104. The processor 104 is configured to receive the current gaze of the user from the eye tracking sensor 102. The processor 104 is also configured to display a cursor on the display within the gaze of the user. The processor 104 is in communication with an input device 106. The input device 106 is configured to receive an input from the user and to communicate the inputs to the processor 104 so that the processor may move the cursor in response to the input. Using the user interface system 100, eye tracking may support the user by placing the cursor (e.g., directly) where the user is currently looking on a display (e.g., within the gaze of the user). The input device 106 may include or be at least one of: a voice recognition system 106A, a tactile feedback system 106B, a haptic technology system 106C, a touch screen 106D, a multi-touch surface 106E, a pressure-triggered screen with a stylus 106F, a joystick 106G, a keyboard 106H, a cursor control panel 106I, and a mouse 106J.

Figure 3A:
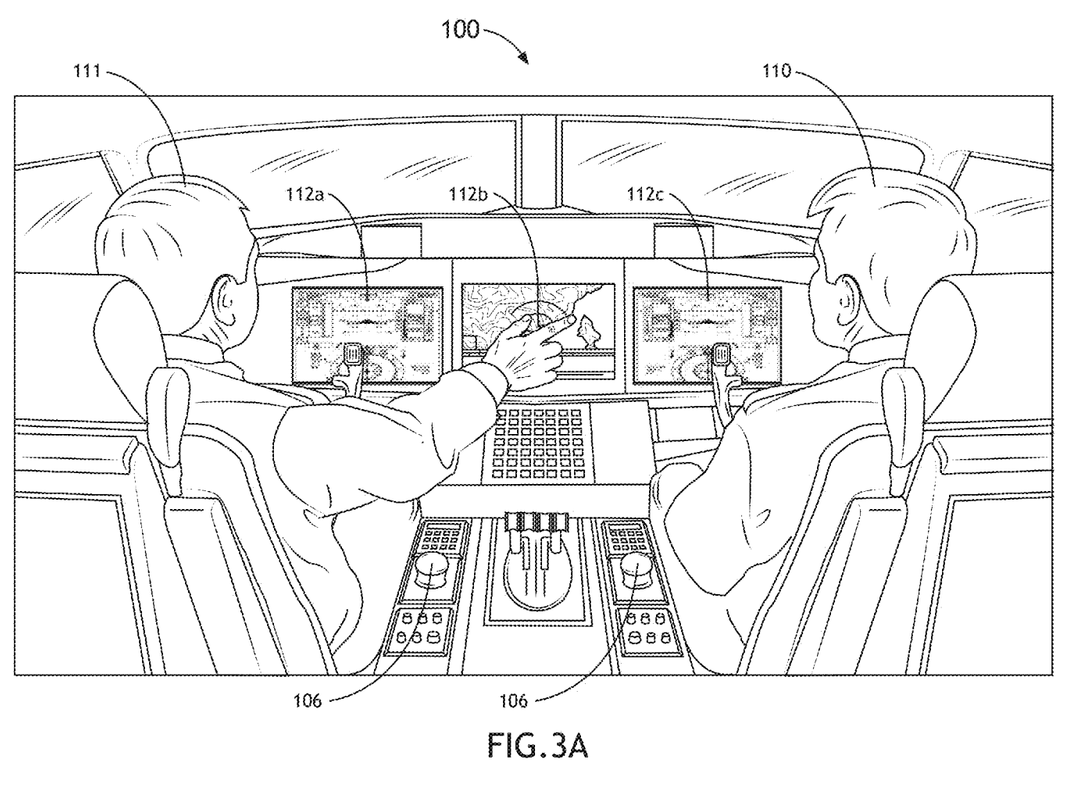
FIG. 3A is a view of a cockpit including the user interface system.
Figure 3B:
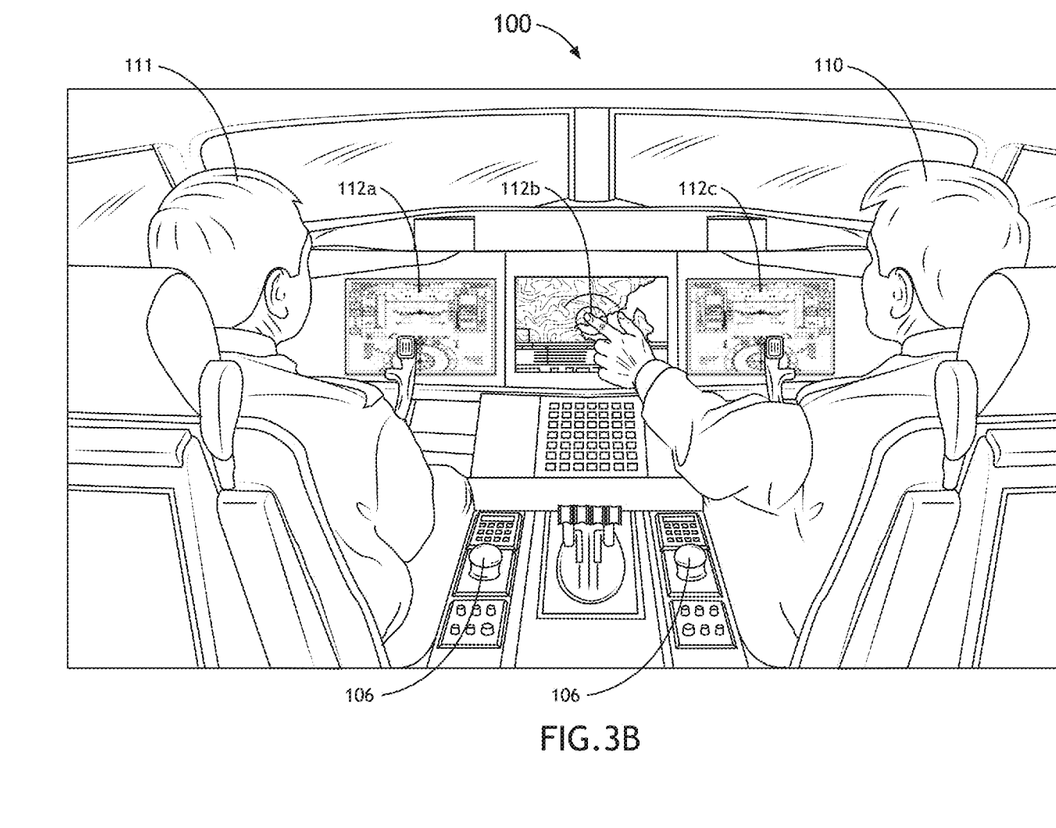
FIG. 3B is a view of a cockpit including the user interface system.
Figure 3C:
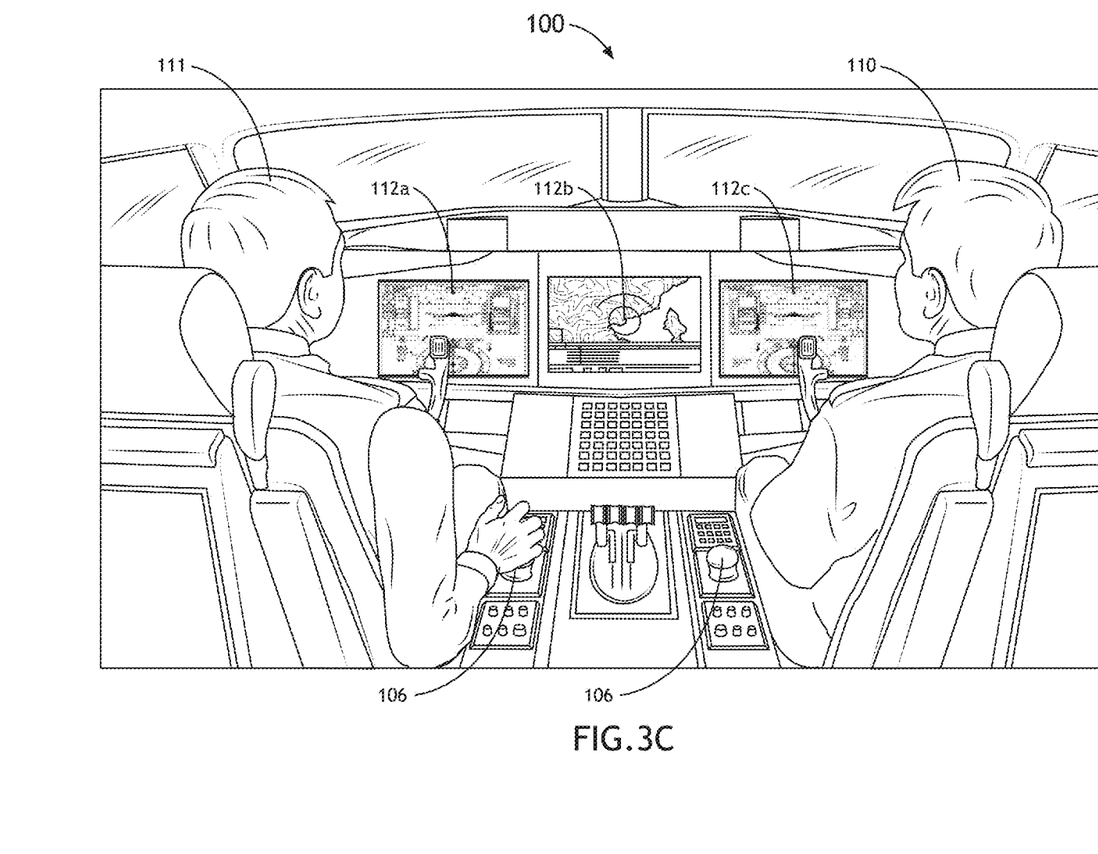
FIG. 3C is a view of a cockpit including the user interface system.
Figure 3D:
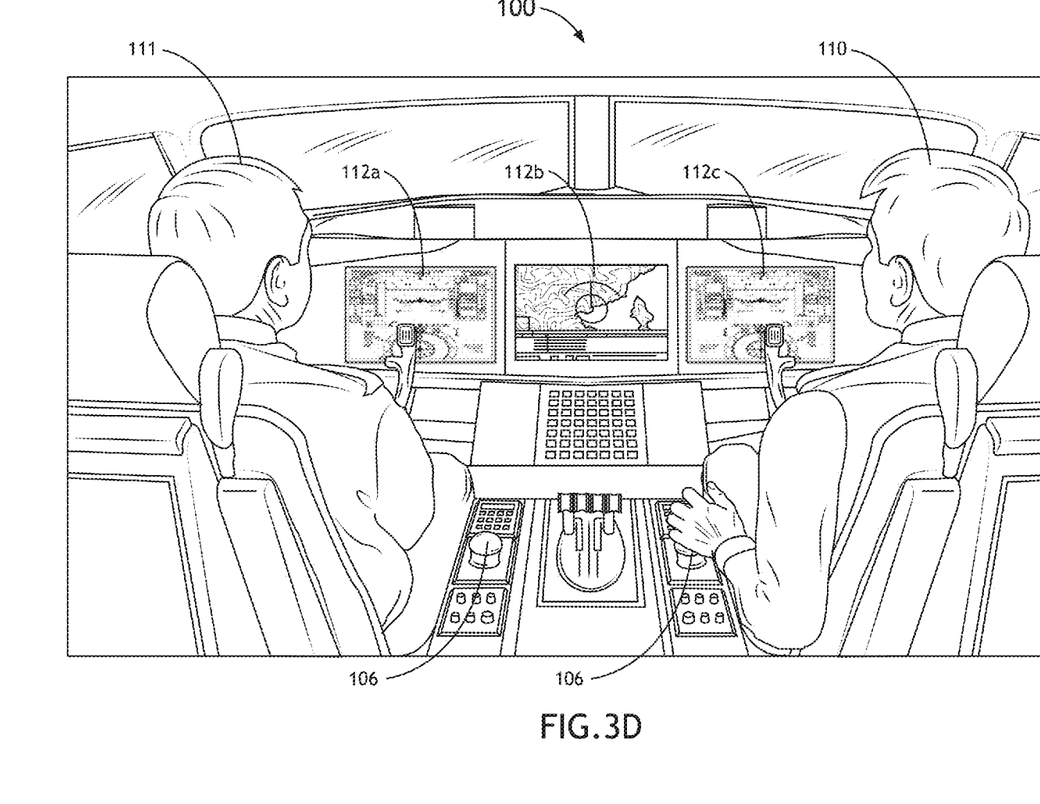
FIG. 3D is a view of a cockpit including the user interface system.

An example implementation of the user interface system 100 within a cockpit of an aircraft is provided in FIGS. 3A, 3B, 3C, and 3D. In this implementation, a first pilot 110 and a second pilot 111 may use the user interface system 100 simultaneously. Specifically, the user interface system 100 includes a first display 112a, a second display 112b, and a third display 112c. As shown in FIGS. 3A and 3B, the second display 112b may be shared by both the first pilot 110 and the second pilot 111. The first pilot 110 and the second pilot 111 may provide input to the second display 112b by touching it directly in some embodiments, as it may be a touch screen. The first pilot 110 and the second pilot 111 may also provide input via an input device 106. For example, in FIGS. 3C and 3D, the first pilot 110 and second pilot 111 may each provide input to the user interface system 100 via the respective input devices 106. The user interface system 100 may be configured to detect which pilot is providing input via the display 112b (if it is configured to be a touch screen) or the input device 106. This information may also be combined with information about the pilot's gaze to provide efficient interaction with the user interface system 100.

Figure 2:
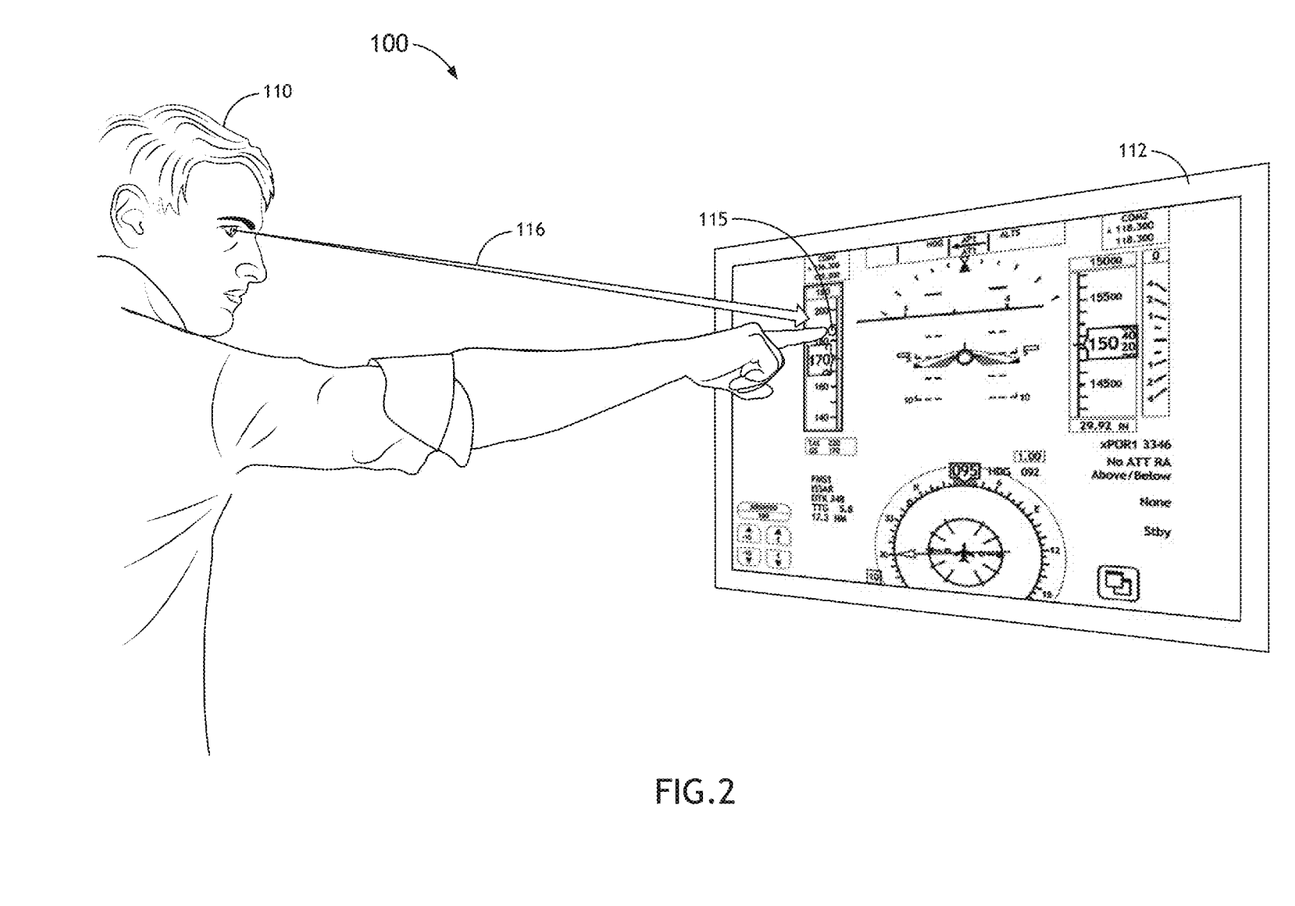
FIG. 2 is an example implementation of user interface system including a touch display and eye tracking system in a flight display.

Referring generally to FIG. 2, the eye tracking sensor 102 may detect the gaze 116 of the first pilot 110 or the second pilot 111 at a location in the display 112, relative to a display 112 or another object or position in the cockpit, and/or as the gaze 116 moves between displays 112 or other cockpit equipment. The gaze 116 may refer to an area where an object or information is visually perceivable by the user. The display 112 may refer to any display within the flight deck, including any one of displays 112a-c or another display, as applicable. In the embodiment shown in FIG. 2, the display 112 is a touch screen and may function as both the input device 106 and the display 112.

The processor 104 correlates the location of the gaze 116 relative to the display 112 and may locate the cursor 115 partially or completely within a location on the display 112 correlated with the location of the gaze 116. In addition, the processor 104 may be configured to receive information from the input device 106 or via the display 112, and determine the identity of a user of the user interface system 100 (e.g., which user of two or more users in the cockpit provides input to the input device 106). For example, the information may include whether the first pilot 110 or second pilot 111 is providing input to the user interface system 100 via the input device 106.

The eye tracking sensor 102 may be suitable for implementation in an aircraft. The eye tracking sensor 102 may include a single sensor or a plurality of sensors. The eye tracking sensor 102 may include an infrared sensor in one embodiment. The eye tracking sensor 102 may include a non-contact system for measuring eye motion in one embodiment. In another embodiment, the eye tracking sensor 102 includes an attachment to the eye such as a contact lens for measuring the movement of the eye. In another embodiment, the eye tracking sensor 102 includes a sensor placed around the eyes to measure movement. In another embodiment, the eye tracking sensor 102 may be partially or completely embedded within the displays of the aircraft or within other sub systems on the aircraft or may be implemented as a separate device in the aircraft's cockpit. The eye tracking sensor 102 may also be located adjacent to or near a display 112 on the aircraft. In addition, the eye tracking sensor 102 may be configured to detect a relative position or location of the gaze 116 of the user within a single display 112 or between or within two or more different displays 112. It is understood that the type of eye tracking sensor 102 is not limited to the examples described and any suitable technology for detecting a gaze of a user may be used with the user interface system 100.

The processor 104 may be in communication with the eye tracking sensor 102 and the input device 106 as shown in FIG. 1A. The processor 104 is configured to receive information indicative of a direction, location, or position of the gaze 116 of the first pilot 110 or the second pilot 111 from the eye tracking sensor 102 (e.g., relative to the display 112). The processor 104 may also be in communication with the input device 106. The processor 104 is configured to receive information indicative of a location, direction, or position the gaze 116 of the user (e.g., relative to the display 112) and to display a cursor 115 in a location on the display 112 that corresponds to the location, direction, or position of the gaze 116 of the user. In addition, the processor 104 may be configured to receive information indicative of the gaze 116 of the user corresponding to a particular display 112 within a multiple display system (e.g., including displays 112a-c). The processor 104 may display the cursor 115 on the particular display 112 that is within the gaze 116 of the user and in a specific location on the display 112 within the gaze 116 of the user. In addition, the processor 104 may be configured to make a determination regarding which user of the user interface system 100 is currently providing input to the user interface system 100, through an input device 106 and/or through the display 112 (e.g., directly). For example, the input device 106 may provide data to the processor 104 regarding the input and the processor 104 may be configured to determine an identity of the user based on the data from the input device 106. Similarly, the processor 104 may use the eye tracking sensor 102 in combination with data received from the input device 106 to determine which user (for example, the first pilot 110 or second pilot 111) is currently viewing a particular display 112 and providing input to the user interface system 100.

In one embodiment, the user interface system 100 may restrict automatic cursor events based upon gaze 116 due to the possibility of problems resulting from the unintentional nature of eye movement. Similarly, a positive user action (for example, a user input through the input device 106) may be coupled with gaze 116 actions in order to execute certain changes to cursor location.

The processor 104 may include any suitable computer processor. The processor 104 may be implemented as a separate system on the flight deck, or incorporated within an existing system on the aircraft, such as the Flight Management System. The processor 104 may be in communication with other systems for the aircraft, including both on board and off board communication systems.

The user interface system 100 may be configured to operate with existing display systems for the aircraft. The display 112 may include a display device for displaying graphical, video, photographic, and textual information to a user. For example, the display 112 may be a touchscreen, multi-function display, monitor, cathode ray tube, liquid crystal display, head up display, head down display, projector, plasma, flat panel or any other type of display 112 suitable for a flight deck or configured to present information in a form perceivable by a user. Similarly, the display 112 may include a single display or a plurality of displays located in the flight deck.

The input device 106 is configured to receive input from the user. The input may include an acknowledgement, a response, a request, or a change to information. The user may provide input to the system 100 via any suitable input device 106. For example, the user may provide input via tactile feedback or haptic technology, such as a button, a touch screen, a multi-touch surface, a pressure-triggered screen with a stylus, a keyboard, mouse, a haptic device incorporating a tactile sensor, or any other suitable device for receiving input from a user. The input device 106 may also include a voice recognition system or device such as a microphone allowing the user to provide verbal or sound input. The input device 106 may include an existing input device 106 for the aircraft, or a new input device 106. The input device 106 may also combine different input device types, such as a haptic system and a voice recognition system, or multiple types of haptic systems or the like. The input device 106 may be located on the user controls allowing rapid access for the user. The input device 106 may include a single input device or multiple input devices.

The input device 106 may be further configured to identify a user providing input to the input device 106 and to transmit that information to the processor 104. For example, the input device 106 may include infrared sensors configured to track hand, finger, and/or thumb position in order to derive who is providing input to the input device 106. In addition, in embodiments, the input device 106 may be incorporated into the display 112, for example when the input device 106 is a touchscreen. In those instances, infrared sensors embedded in the touchscreen may be configured to track hand, finger, and/or thumb position, or combinations thereof, to derive which particular user of two or more users is providing input to the input device 106.

The eye tracking sensor 102, processor 104, and input device 106 may be separate sub-systems or may be incorporated into a single system. Similarly, each of the eye tracking sensor 102, processor 104, and input device 106 may be incorporated within existing systems and sub systems for the aircraft. In some embodiments, the input device 106 may be combined with the display 112, for example when the display 112 is configured to receive inputs. Similarly, the eye tracking sensor 102 may be embedded within the display 112 or the input system 106.

The user interface system 100 may be incorporated as part of a goal-based Flight Management System. For example, the user interface system 100 may be useful in meeting the goal of reducing user workload. Similarly, the user interface system 100 may be useful in other goal-based Flight Management System applications. The user interface system 100 may also be configured as part of a pilot driven interface in one embodiment.

The user interface system 100 may be used on a variety of aircraft, such as civilian aircraft, military aircraft, helicopters, regional jets, business jets, and other aircraft. The user interface system 100 may also be useful in other vehicles or contexts where it is useful to interface with an operator or user via eye tracking.

The user may include a pilot in one embodiment, or multiple pilots. Similarly, the user may include a crew member of an aircraft, a driver of a vehicle, or any other user that interacts with a user interface system.

Figure 4:
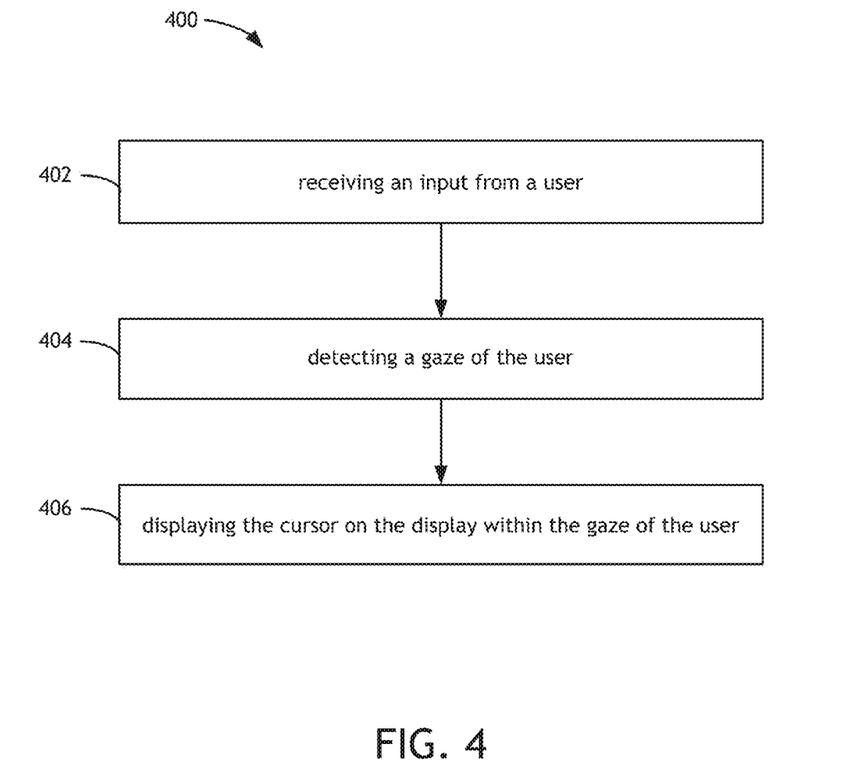
FIG. 4 is a flow diagram of a method for managing a location of a cursor on a display.

The present disclosure is also directed to a method 400 for managing a location of a cursor on a display as shown in FIG. 4. The method 400 may be executed by the user interface system 100, or another suitable system. A step 402 of the method 400 may include receiving an input from a user (e.g., via the input device 106). A step 404 may include detecting a gaze 116 of the user within the display. A step 406 may include displaying the cursor on the display within the gaze of the user.

In embodiments, step 406 may also include positioning the cursor on the display within the gaze of the user in response to receiving the input from the input device 106. For example, sometimes cursors may be hidden when a certain period of inactivity in the system occurs. When the system receives the input from the input device, this may initiate the command to display the cursor on the display within the gaze of the user, rather than at the last cursor location before the period of inactivity began.

In one embodiment, the method 400 may include additional steps and may be suitable for environments including two or more users providing input via the same input system, such as two pilots providing input to a shared touch display. For example, the method 400 may include the step of receiving the input from at least one of a first user or a second user via the input device. An additional step of the method 400 may include detecting at least one of: a hand position, a finger position, a thumb position, or a voice command of at least one of the first user or the second user via the input device. A further step of the method 400 may include determining an identity of the user based on the detecting. Yet another step of the method 400 may include displaying the cursor on a display within the gaze of the user identified based on the detection step.

Figure 5:
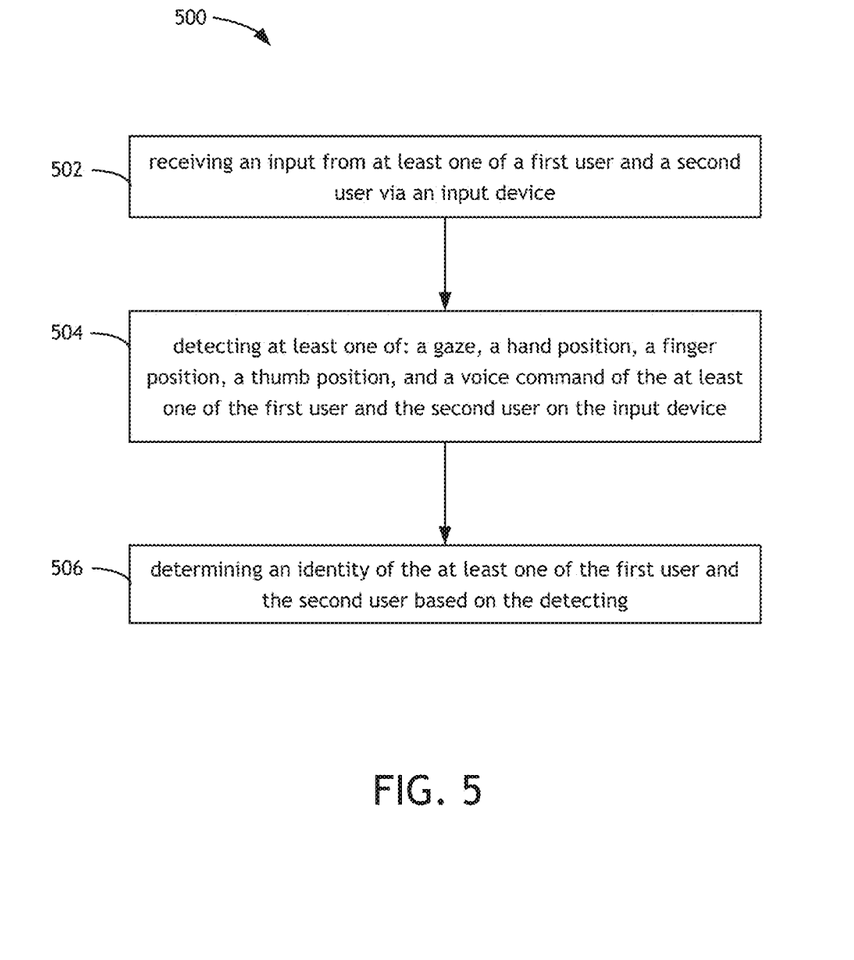
FIG. 5 is a flow diagram of a method for identifying a user of an interface configured to receive inputs from two or more users.

The present disclosure is also directed to a method 500 for identifying a user of an interface configured to receive inputs from two or more users as shown in FIG. 5. A step 502 of the method 500 may include receiving an input from at least one of a first user or a second user via an input device. The input device may include a touchscreen display or other suitable input device. A step 504 may include detecting at least one of: a gaze, a hand position, a finger position, a thumb position, and a voice command of at least one of the first user or the second user (e.g., via the input device. A step 506 may include determining an identity of the user (e.g., which of the first and second user is providing the input).

The method 500 may include additional steps. For example, the method 500 may include the step of detecting a gaze of the user that was determined to be the current user. The method 500 may further include the step of displaying the cursor on a display within the gaze of the current user identified based on the step of detecting at least one of: a gaze, a hand position, a finger position, a thumb position, or a voice command of at least one of the first user or the second user on the input device.

The systems and methods of the present disclosure may provide several advantages. First, the systems and methods of the present disclosure may reduce a user's workload by reducing the number of steps required to locate and manipulate a cursor by placing the cursor where the user is looking (e.g., directly within the gaze of the user). The systems and methods of the present disclosure may also support simplification of aircraft interfaces by reducing the number of input devices and controls, including control systems that may be imperfect or difficult to use such as a mouse or a trackball cursor control device. The systems and methods may also facilitate reduced workloads when two or more users are providing inputs to the same system by actively identifying the user that is interacting with the system.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

What is claimed is:

1. A method for managing a location of a cursor on at least three displays of an aircraft, comprising:
    receiving, via at least one input device implemented in a cockpit of an aircraft, at least one input at least from one pilot of at least two pilots including a first pilot and a second pilot;
    detecting, via at least one eye tracking sensor implemented in the cockpit of the aircraft, a gaze of one pilot of the at least two pilots;
    determining, via at least one processor of a Flight Management System implemented in the aircraft, the detected gaze to be relative to a shared display of at least three displays configured to display information to the at least two pilots, wherein the at least three displays are implemented in a flight deck of the cockpit of the aircraft, wherein the shared display is a touchscreen display viewable and user-interfaceable at least by the first pilot and the second pilot, wherein the shared display is a center display positioned between two displays of the at least three displays implemented in the flight deck of the cockpit of the aircraft;
    determining, via the at least one processor of the Flight Management System implemented in the aircraft, the detected gaze to be of a particular pilot of the at least two pilots;
    determining, via the at least one processor of the Flight Management System implemented in the aircraft, a location for a cursor to be displayed based at least on the detected gaze, the determination that the detected gaze is relative to the shared display, the at least one received input, and the determination that the detected gaze is of the particular pilot of the at least two pilots, wherein the at least one received input includes a positive user action, wherein determining the location for the cursor to be displayed restricts automatic cursor events from occurring based only on the detected gaze; and
    displaying, by the shared display of the at least three displays, the cursor at the location corresponding to the detected gaze of the particular pilot.

2. The method as claimed in claim 1, wherein the at least one input device is or includes at least one of: the shared display, a voice recognition system, a tactile feedback system, a haptic technology system, a touch screen, a multi-touch surface, a pressure-triggered screen with a stylus, a joystick, a keyboard, a cursor control panel, and a mouse.

3. The method as claimed in claim 1, wherein the Flight Management System is a goal based Flight Management System.

4. The method as claimed in claim 1, wherein receiving, via at least one input device, at least one input at least from one pilot of at least two pilots including a first pilot and a second pilot includes:
    receiving, via at least one input device, at least one input from the first pilot of the at least two pilots; and
    receiving, via at least one input device, at least one input from the second pilot of the at least two pilots;
wherein the method further comprises:
    for the at least one input of each of the first pilot and the second pilot, detecting a gaze and at least one of: a hand position, a finger position, a thumb position, and a voice command; and
    determining an identity of each of the first pilot and the second pilot.

5. The method as claimed in claim 1, wherein the at least one input device is or includes a voice recognition system.

6. The method as claimed in claim 1, wherein receiving, via at least one input device, at least one input at least from one pilot of at least two pilots including a first pilot and a second pilot includes:
    receiving, via at least one input device, at least one input from the first pilot of the at least two pilots; and
    receiving, via at least one input device, at least one input from the second pilot of the at least two pilots;
wherein the method further comprises:
    for the at least one input of each of the first pilot and the second pilot, detecting a gaze and at least one of: a hand position, a finger position, and a thumb position; and
    determining an identity of each of the first pilot and the second pilot.

7. A system for an aircraft, comprising:
    at least one input device implemented in a cockpit of an aircraft, the at least one input device configured to receive at least one input at least from one pilot of at least two pilots including a first pilot and a second pilot;
    at least one eye tracking sensor implemented in the cockpit of the aircraft, the at least one eye tracking sensor configured to detect a gaze of one pilot of the at least two pilots;
    at least three displays configured to display information to the at least two pilots, the at least three displays including a shared display, the shared display being a touchscreen display viewable and user-interfaceable at least by the first pilot and the second pilot, wherein the at least three displays are implemented in a flight deck of the cockpit of the aircraft, wherein the shared display is a center display positioned between two displays of the at least three displays implemented in the flight deck of the cockpit of the aircraft; and a Flight Management System comprising at least one processor implemented in the aircraft, the at least one processor of the Flight Management System communicatively coupled with the at least one eye tracking sensor, the shared display, and the at least one input device, the at least one processor configured to:
  determine the detected gaze to be relative to the shared display of the at least three displays;
  determine the detected gaze to be of a particular pilot of the at least two pilots; and
  determine a location for a cursor to be displayed based at least on the at least one received input, a detected gaze, a determination that the detected gaze is relative to the shared display, and a determination that the detected gaze is of the particular pilot of the at least two pilots, wherein the at least one received input includes a positive user action, wherein a determination of the location for the cursor to be displayed restricts automatic cursor events from occurring based only on the detected gaze;
wherein the shared display is configured to display the cursor at the location corresponding to the detected gaze of the particular pilot.

8. The system as claimed in claim 7 wherein the at least one input device is or includes at least one of: the shared display, a voice recognition system, a tactile feedback system, a haptic technology system, a touch screen, a multi-touch surface, a pressure-triggered screen with a stylus, a keyboard, and a mouse.

9. The system as claimed in claim 7, wherein the at least one input device is further configured to receive the at least one input from at least one of the first pilot and the second pilot, the at least one input device being further configured to detect at least one of: a hand position, a finger position, a thumb position, and a voice command of at least one of the first pilot and the second pilot.

10. The system as claimed in claim 7, wherein the at least one processor of the Flight Management System is further configured to determine an identity of the particular pilot based at least on the detected gaze.

11. The system as claimed in claim 7, wherein the at least one input device is or includes the shared display.

12. The system as claimed in claim 7, wherein the at least one input device is or includes a voice recognition system.

13. The system as claimed in claim 7, wherein the at least one input device is further configured to receive the at least one input from at least one of the first pilot and the second pilot, the at least one input device being further configured to detect at least one of: a hand position, a finger position, and a thumb position.

14. The system as claimed in claim 7, wherein the at least one eye tracking sensor is located adjacent to at least one of the at least three displays.

15. A method for identifying a user of an interface configured to receive inputs from two or more pilots of an aircraft, comprising:
  receiving, via at least one input device implemented in a cockpit of an aircraft, at least two inputs from at least two pilots including a first pilot and a second pilot;
  detecting, via at least one eye tracking sensor implemented in the cockpit of the aircraft, a gaze of a pilot of the at least two pilots;
  determining, via at least one processor of a Flight Management System implemented in the aircraft, the detected gaze to be relative to a shared display of at least three displays configured to display information to the at least two pilots, wherein the at least three displays are implemented in a flight deck of the cockpit of the aircraft, wherein the shared display is a touchscreen display viewable and user-interfaceable at least by the first pilot and the second pilot, wherein the shared display is a center display positioned between two displays of the at least three displays implemented in the flight deck of the cockpit of the aircraft;
  determining, via the at least one processor of the Flight Management System implemented in the aircraft, the detected gaze to be of a particular pilot of the at least two pilots;
  determining, via the at least one processor of the Flight Management System implemented in the aircraft, an identity of the particular pilot based at least on the detected gaze;
  determining, via the at least one processor of the Flight Management System implemented in the aircraft, a location for a cursor to be displayed based at least on the at least two received inputs, the detected gaze, the determination that the detected gaze is relative to the shared display, the determined identity of the particular pilot, and the determination that the detected gaze is of the particular pilot of the at least two pilots, wherein the at least two received inputs includes a positive user action, wherein determining the location for the cursor to be displayed restricts automatic cursor events from occurring based only on the detected gaze; and
  displaying, by the shared display of the at least one displays, the cursor at the location corresponding to the detected gaze of the particular pilot.

16. The method as claimed in claim 15, wherein the at least one input device is or includes at least one of: the shared display, a voice recognition system, a tactile feedback system, a haptic technology system, a touch screen, a multi-touch surface, a pressure-triggered screen with a stylus, a joystick, a keyboard, a cursor control panel, and a mouse.

17. The method as claimed in claim 15, wherein the at least one input device is or includes the shared display.

18. The method as claimed in claim 15, further comprising:
  detecting at least one of: a hand position, a finger position, a thumb position, and a voice command of at least one of the first pilot and the second pilot.

19. The method as claimed in claim 15, wherein the at least one input device is or includes a voice recognition system.

20. The method as claimed in claim 15, further comprising:
  detecting at least one of: a hand position, a finger position, and a thumb position of at least one of the first pilot and the second pilot.

* * * * *